June 28, 1938.  H. O. KRANICH ET AL  2,122,254
APPARATUS FOR USE IN THE CUTTING OF PLASTIC SHEETING
Filed Sept. 30, 1936   3 Sheets-Sheet 1
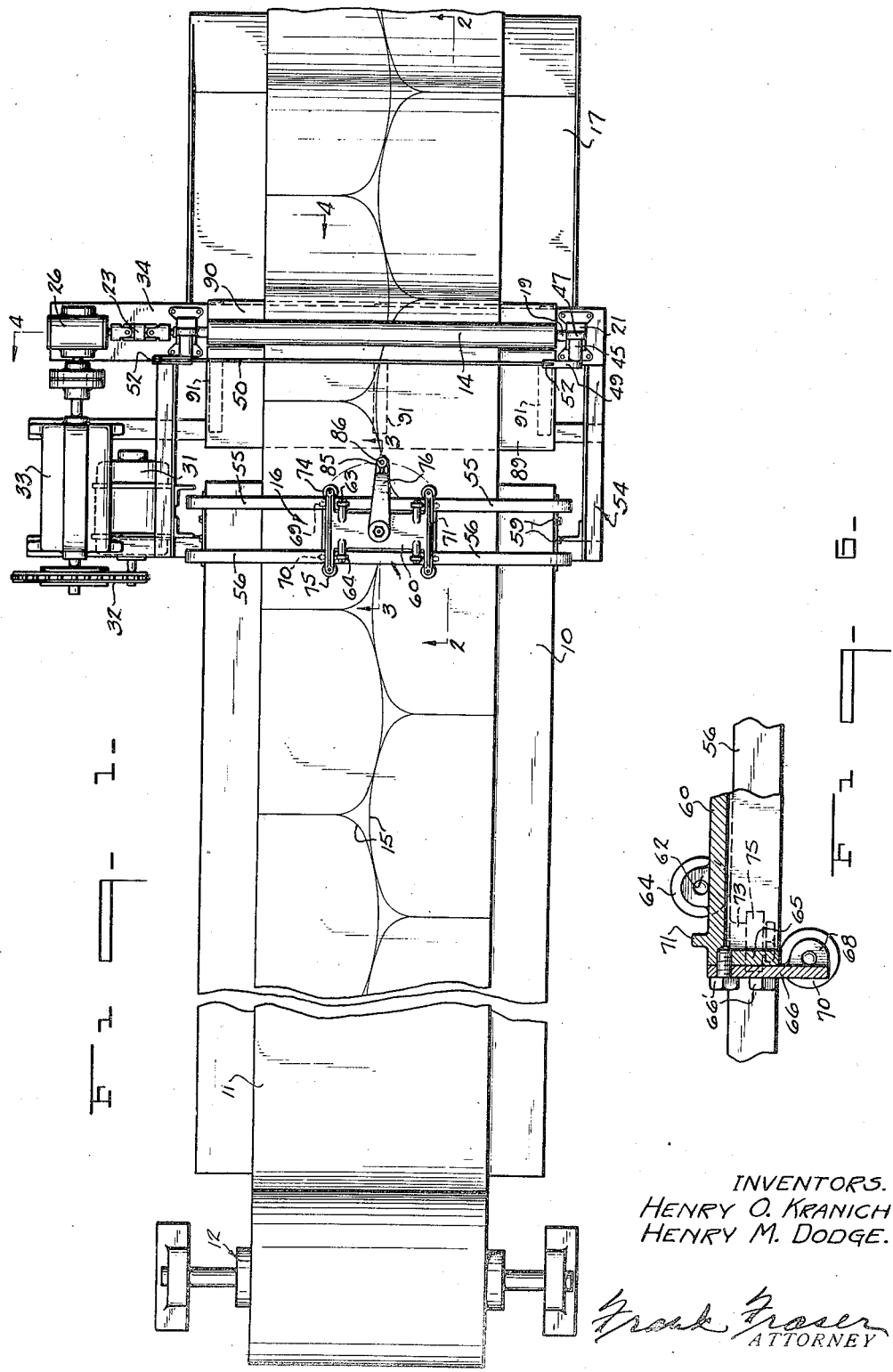
INVENTORS.
HENRY O. KRANICH.
HENRY M. DODGE.
Frank Fraser
ATTORNEY

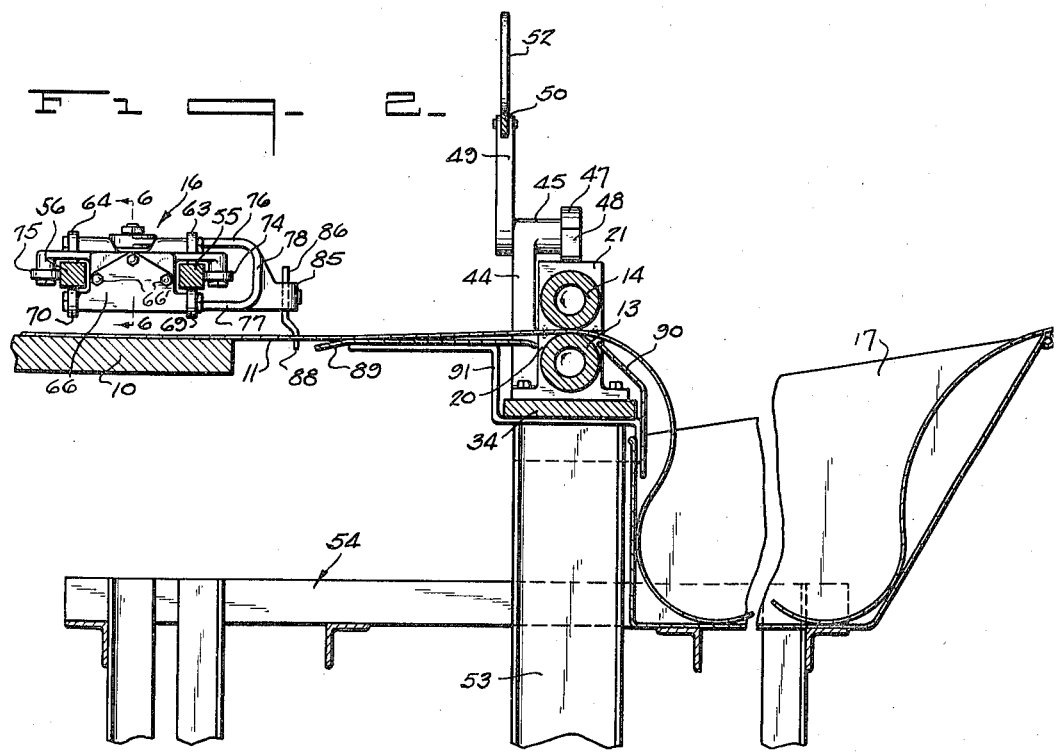
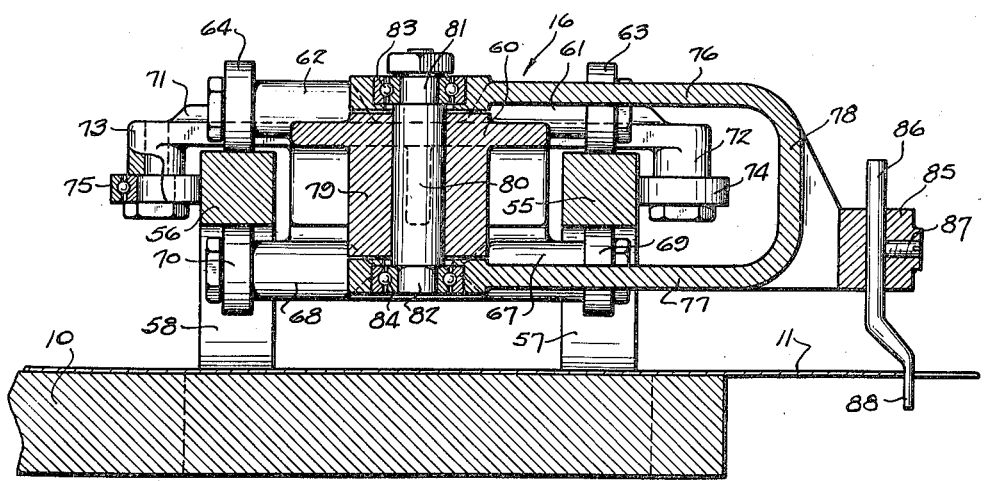

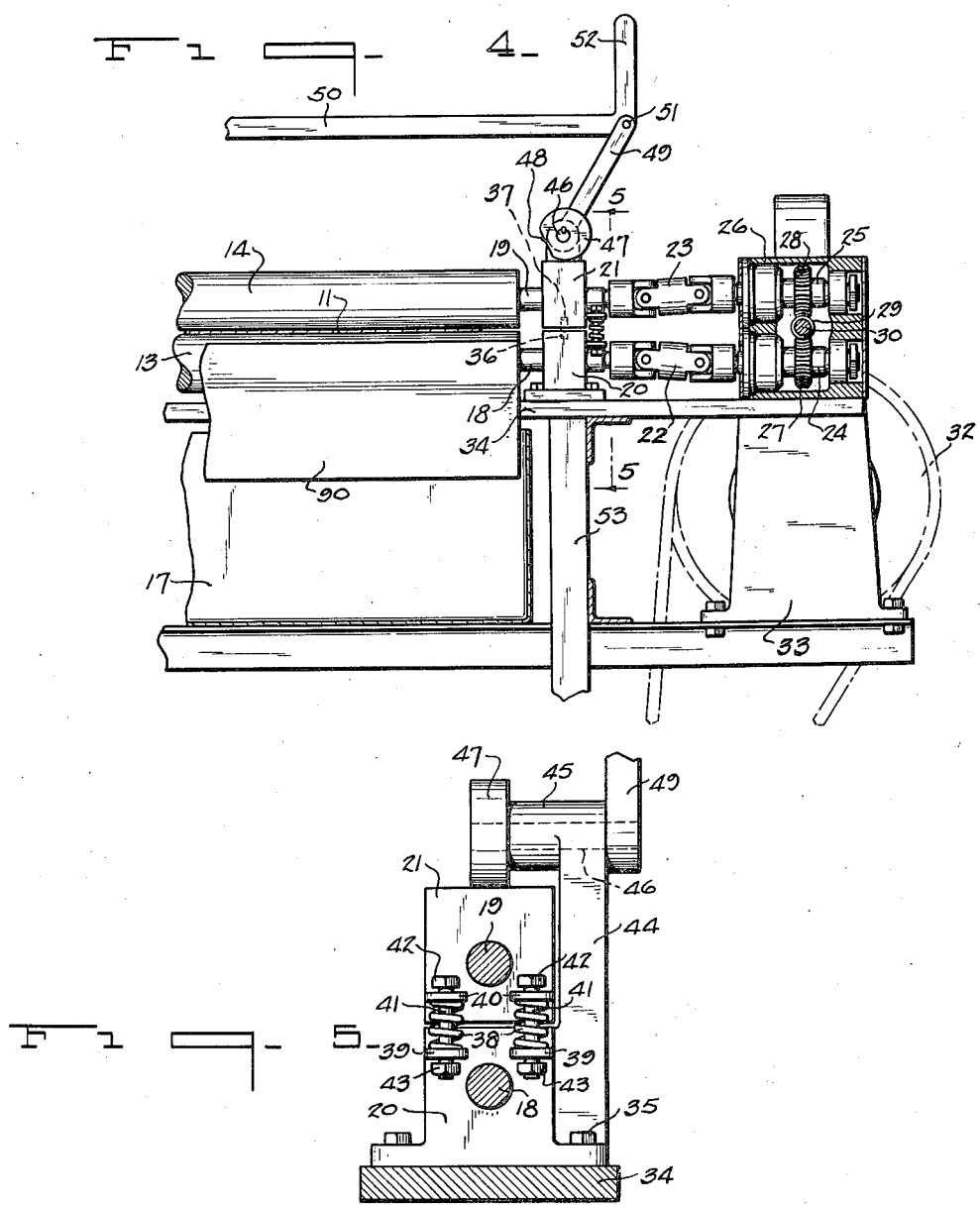

Patented June 28, 1938

2,122,254

UNITED STATES PATENT OFFICE

2,122,254

APPARATUS FOR USE IN THE CUTTING OF PLASTIC SHEETING

Henry O. Kranich and Henry M. Dodge, Toledo, Ohio, assignors to Libbey-Owens-Ford Glass Company, Toledo, Ohio, a corporation of Ohio Application September 30, 1936, Serial No. 103,295

13 Claims. (Cl. 164—17)

The present invention relates broadly to the art of cutting and more particularly to an apparatus primarily designed for use in the cutting of plastic sheeting such as is used in the making of laminated safety glass, although it is of course not limited to this particular use.

In the manufacture of laminated safety glass comprising two sheets of glass and a sheet of transparent plastic material interposed therebetween and bonded thereto to provide a composite structure, the glass and plastic sheets are first cut to the desired size before being assembled and bonded together. The plastic sheeting is ordinarily received by the safety glass manufacturer in relatively large rolls upon which it is wound in the form of a continuous ribbon. The plastic is unwound from the roll as needed and sheets or sections of the desired shape and size cut therefrom. The cutting is usually accomplished by first scoring the plastic with a suitable scriber such as, for example, a sharp needle, after which the cut section or sheet is broken out by flexing the plastic. The scoring and breaking operations are performed manually and in scoring the plastic, the operator usually employs a template of the desired contour which serves as a guide for the scriber.

An important object of this invention is the provision of apparatus for greatly facilitating, expediting, and improving generally the scoring of the plastic sheeting and the subsequent breaking out of the cut sheets or sections therefrom.

Another important object of the invention is the provision of such an apparatus wherein the plastic sheeting is slowly but continuously withdrawn from the roll and the scoring thereof by the operator accomplished as it is moving forwardly.

Another important object of the invention is the provision, in apparatus of the above character, of means for automatically splitting the ribbon of plastic longitudinally as it is carried forwardly, said splitting being subsequent to the scoring thereof by the operator.

Other objects and advantages of the invention will become more apparent during the course of the following description when taken in connection with the accompanying drawings.

In the drawings wherein like numerals are employed to designate like parts throughout the same, Fig. 1 is a plan view of apparatus constructed in accordance with the present invention;

Fig. 2 is a longitudinal vertical sectional view taken substantially on line 2—2 of Fig. 1;

Fig. 3 is a longitudinal sectional view of the plastic splitting means taken substantially on line 3—3 of Fig. 1;

Fig. 4 is a transverse sectional view of a portion of the means for drawing the plastic from the roll, taken substantially on line 4—4 of Fig. 1;

Fig. 5 is a vertical sectional view taken substantially on line 5—5 of Fig. 4; and Fig. 6 is a vertical sectional view through the plastic splitting means taken substantially on line 6—6 of Fig. 2.

In the embodiment of the invention illustrated in the drawings, 10 designates the flat horizontal top of a stationary table or like support over and in contact with which the plastic sheeting 11 is drawn and upon which the said sheeting is adapted to be cut by the operator. As brought out above, the plastic is ordinarily received by the safety glass manufacturer in a relatively large roll and this roll is positioned at one end of the table 10 as indicated at 12, the plastic being withdrawn slowly but continuously from said roll by the action of a pair of superimposed driven rolls 13 and 14 extending transversely of said table at the opposite end thereof. The two rolls 13 and 14 are adapted to grip the plastic therebetween and draw it forwardly over the table 10.

During the movement of the plastic over the table, sheets or sections of the desired shape and size are scored by one or more operators, then the sheet is mechanically split longitudinally and after the plastic passes between the rolls 13 and 14, the scored sheets or sections are completely broken out by manually flexing the plastic sheeting. The scoring is achieved by placing a template of the desired contour upon the moving plastic and then manually drawing a scriber or the like around and in engagement with the edge of the template to effect the scoring of the plastic along the desired lines as indicated at 15 in Fig. 1.

After the plastic has been scored and before it passes between the rolls 13 and 14, it is automatically split longitudinally by the splitting means 16 which greatly facilitates the complete breaking out of the scored sheets or sections by the operator after the plastic passes between the rolls where it is received in a relatively large trough or receptacle 17. By drawing the plastic continuously forwardly over the table, the said plastic will be caused to lie flat thereon whereby to permit the rapid manual scoring thereof. If desired, two operators can be stationed at opposite sides of the table so as to effect the double scoring of the plastic in the manner shown in Fig. 1.

The drawing rolls 13 and 14 are carried by shafts 18 and 19 respectively which are mounted at each end in superimposed journal boxes 20 and 21, said shafts 18 and 19 projecting at one end beyond the respective journal boxes and being connected by universal couplings 22 and 23 to horizontal shafts 24 and 25 rotatably mounted in a housing 26. Keyed to the shafts 24 and 25 within housing 26 are worm gears 27 and 28 which mesh with a worm 29 carried by a horizontal shaft 30 extending at right angles to the shafts 24 and 25. The shaft 30 is driven from a motor 31 through a chain and sprocket drive or the like 32 and reduction gearing contained in the gear case 33. Upon rotation of the shaft 30, the rolls 13 and 14 will be driven in opposite directions, as indicated by the arrows in Fig. 2, to advance the plastic sheeting 11 forwardly therebetween.

The journal boxes 20 at opposite ends of the roll 13 are secured to a horizontal transverse plate 34 by screws or the like 35 while the journal boxes 21 are removably associated with the journal boxes 20 and are freely supported thereon. Each stationary journal box 20 is shown as being provided with a pair of vertical pins or keys 36 which are loosely received in openings 37 in the respective upper journal box 21, said keys serving to maintain the journal boxes in proper relation while at the same time permitting vertical movement of the upper box relative to the lower box.

The journal boxes 21 are normally urged upwardly away from the lower boxes 20, to maintain the rolls 13 and 14 spaced from one another, by means of a pair of compression springs 38 arranged between ears 39 and 40 carried by the boxes 20 and 21 respectively and encircling vertical bolts 41 which pass through said ears, the bolts being provided with heads 42 at one end and nuts 43 at their opposite end to limit the upward movement of the journal boxes 21 with respect to journal boxes 20.

Each journal box 20 is provided with an upstanding portion 44 terminating in a horizontally disposed sleeve 45 through which extends a shaft 46 carrying at one end a cam 47 provided with the flat portion 48, said shaft 46 having keyed to its opposite end a lever 49. The two levers 49 at the opposite ends of the rolls are connected together by a transverse rod 50 pivoted as at 51 to the said levers and formed at one end with a handle 52. When the levers 49 are swung so that the flat portions 48 of the cams 47 are moved to a horizontal position to engage the upper surfaces of the journal boxes 21, the said boxes will be urged upwardly by the springs 38 to move the upper roll 14 away from lower roll 13 so as to disengage the plastic. However, when the cams 47 are moved to the position shown in Fig. 4, the upper journal boxes 21 will be moved downwardly against the action of the springs 38 so that the plastic is gripped between the rolls.

The transverse plate 34 supporting the journal boxes 20 and 21 is supported at each end by an upright 53 and also mounted upon the said plate is the housing 26. The remaining parts of the plastic drawing apparatus and the receptacle 17 are carried by a suitable structural framework 54.

The plastic splitting means 16 embodies a pair of spaced parallel rails 55 and 56 arranged transversely above the table 10 adjacent the end thereof remote from the roll of plastic 12 and slightly in advance of the drawing rolls 13 and 14. The opposite ends of the rails 55 and 56 are turned downwardly as at 57 and 58 (Fig. 3) and are secured to the table by bolts or the like 59 (Fig. 1). Mounted to roll freely along the rails 55 and 56 is a carriage comprising a substantially rectangular T-shaped body portion 60 positioned between said rails. Carried adjacent each end of the body portion are the oppositely disposed horizontal sleeves 61 and 62 in which are mounted shafts carrying rollers 63 and 64 which ride along upon the upper surfaces of the rails 55 and 56 respectively to support the carriage.

The body portion 60 of the carriage is provided with vertical depending end portions 65 (Fig. 6) and secured to each end portion is a plate 66 by screws or the like 66'. Formed on each end plate are oppositely directed horizontal sleeves 67 and 68 in which are mounted shafts 20 carrying at their outer ends rollers 69 and 70 which engage the under surfaces of the rails 55 and 56, the rolls 69 and 70 being arranged outwardly of the rolls 63 and 64. Also formed integral with the body portion 60, adjacent each end thereof, is a transverse rib 71 which projects at its opposite ends beyond the rails 55 and 56 and is formed with vertical sleeves 72 and 73 in which are mounted relatively short shafts carrying rollers 74 and 75 which engage the outer surfaces of said rails. The provision of rolls engaging both the upper and lower surfaces of the rails as well as the outer surfaces thereof permits freedom of movement of the carriage without bending and with very little friction along the rails.

Carried by the body portion 60 of the carriage intermediate the ends thereof is a substantially U-shaped bracket comprising upper and lower horizontal legs 76 and 77 joined at their forward ends by the vertical connecting portion 78. The body portion 60 of the carriage is formed intermediate its ends with a thickened bearing portion 79 (Fig. 3) and mounted therein is a vertical pin 80 having reduced end portions 81 and 82 upon which the legs 76 and 77 of the bracket are pivotally mounted by means of the ball bearings 83 and 84 so that the said bracket can swing freely horizontally about the axis of the vertical pin 80. Formed integral with the connecting portion 78 of the bracket is a block 85 having a vertical opening through which is inserted the plastic splitting element 86 secured in place by a set screw 87. The lower end 88 of the splitting element is of relatively small diameter and is disposed in the path of travel of the plastic to automatically split the plastic longitudinally along the scored lines as the said plastic is carried forwardly.

When cutting plastic sheeting with the apparatus above described, the roll of plastic 12 is first positioned at the end of the table 10 as shown in Fig. 1, and the free end of the roll drawn over the table and passed between the rolls 13 and 14. The rotation of the rolls will then draw the plastic continuously over and in contact with the table, the tension on the plastic being sufficient to cause it to lie flat. One or more operators at either or both sides of the table are present to score the plastic as it moves forwardly. This is preferably achieved by first laying a template upon the moving plastic and then manually drawing a scriber around the edge thereof. Before passing between the rolls, the plastic is automatically split longitudinally by the splitting element 86, the plastic being received, after it passes between said rolls, in the receptacle 17 where the cut sheets or sections can be completely broken out by simply manually flexing the plastic.

The plastic is guided from the splitting element to the rolls by a plate 89 and from said rolls by a plate 90, both of which plates are carried by brackets 91 secured to the transverse supporting plate 34.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for use in the cutting of plastic sheeting, a substantially flat horizontal support over which the sheeting is adapted to be continuously drawn and upon which it is adapted to be partly cut during movement thereof, and means for automatically splitting the plastic longitudinally as it is carried forwardly.

2. In apparatus for use in the cutting of plastic sheeting, a substantially flat horizontal support over which the sheeting is adapted to be continuously drawn and upon which it is adapted to be partly cut during movement thereof, and a splitting element disposed in the path of travel of the plastic for automatically splitting the same longitudinally as it moves forwardly.

3. In apparatus for use in the cutting of plastic sheeting, a substantially flat horizontal support over which the sheeting is adapted to be continuously drawn and upon which it is adapted to be partly cut during movement thereof, and a pivotally mounted member for automatically splitting the plastic longitudinally as it is carried forwardly.

4. In apparatus for use in the cutting of plastic sheeting, a substantially flat horizontal support over which the sheeting is adapted to be continuously drawn and upon which it is adapted to be partly cut during movement thereof, and a pivotally mounted and bodily movable member for automatically splitting the plastic longitudinally as it is carried forwardly.

5. In apparatus for use in the cutting of plastic sheeting, a substantially flat horizontal support over which the sheeting is adapted to be continuously drawn and upon which it is adapted to be partly cut during movement thereof, a carriage mounted above said support for movement transversely thereof, and a member pivotally carried by said carriage for automatically effecting the splitting of the plastic longitudinally as it is carried forwardly.

6. In apparatus for use in the cutting of plastic sheeting, a substantially flat horizontal support over which the sheeting is adapted to be continuously drawn and upon which it is adapted to be partly cut during movement thereof, spaced parallel rails arranged transversely above said support, a carriage movably mounted upon said rails, and a member pivotally carried by said carriage to swing freely horizontally for automatically effecting the splitting of the plastic longitudinally as it is carried forwardly.

7. In apparatus for use in the cutting of plastic sheeting, a substantially flat horizontal support over which the sheeting is adapted to be drawn and upon which it is adapted to be partly cut, means for continuously drawing the plastic over and in contact with said support, and means arranged in advance of said drawing means for automatically splitting the plastic longitudinally.

8. In apparatus for use in the cutting of plastic sheeting, a substantially flat horizontal support over which the sheeting is adapted to be drawn and upon which it is adapted to be partly cut, a pair of rolls for continuously drawing the plastic over and in contact with said support, and a pivotally mounted member arranged in advance of said drawing rolls for automatically splitting the plastic longitudinally.

9. In apparatus for use in the cutting of plastic sheeting, a substantially flat horizontal support at one end of which a roll of plastic to be cut is arranged, means at the opposite end of said support for drawing the plastic from said roll over and in contact with said support upon which said plastic is adapted to be manually partly cut as it moves forwardly, and a pivotally mounted and bodily movable splitting member arranged in advance of said drawing means for automatically splitting the plastic longitudinally.

10. In apparatus for use in the cutting of plastic sheeting, a substantially flat horizontal support at one end of which a roll of plastic to be cut is arranged, a pair of rolls at the opposite end of said support for drawing the plastic from said roll over and in contact with said support upon which said plastic is adapted to be manually partly cut as it moves forwardly, and a splitting element arranged in advance of said drawing rolls and disposed in the path of travel of the plastic for automatically splitting the same longitudinally.

11. In the cutting of plastic sheeting, the process consisting in drawing the plastic continuously forwardly over and in contact with a substantially flat horizontal supporting surface, partly cutting the plastic during forward movement thereof and while upon said supporting surface, and then splitting the plastic longitudinally as it travels forwardly.

12. In the cutting of plastic sheeting, the process consisting in drawing the plastic continuously forwardly over and in contact with a substantially flat horizontal supporting surface, in manually partly cutting forms or sections of the desired contour from the plastic as it moves forwardly over said supporting surface and in automatically splitting the plastic longitudinally by mechanical means as it is carried forwardly.

13. In the cutting of plastic sheeting, the process consisting in drawing the plastic continuously forwardly over and in contact with a substantially flat horizontal supporting surface, in laying a template of the desired contour upon the plastic as it moves forwardly over said supporting surface, partly cutting the plastic by drawing a scoring tool around the edge of the template during forward movement of said plastic and template, splitting the plastic longitudinally by mechanical means as it travels forwardly, and then completely breaking out the partly cut plastic by manually flexing the same.

HENRY O. KRANICH.
HENRY M. DODGE.